United States Patent [19]
van Waveren

[11] Patent Number: 4,564,319
[45] Date of Patent: Jan. 14, 1986

[54] FLEXIBLE TUBE FOR CONVEYING A MIXTURE OF A LIQUID AND A SOLID MATERIAL

[75] Inventor: Karel C. van Waveren, Nijmegen, Netherlands

[73] Assignee: Vredestein N.V., Velp, Netherlands

[21] Appl. No.: 310,272

[22] Filed: Oct. 9, 1981

[30] Foreign Application Priority Data

Oct. 16, 1980 [NL] Netherlands ......................... 8005695

[51] Int. Cl.⁴ ............................................. B65G 53/54
[52] U.S. Cl. .................................... 406/193; 138/138; 138/174
[58] Field of Search ................ 406/196, 193; 138/138, 138/139, 131, 174, 172; 428/295, 457, 465, 382, 36

[56] References Cited

U.S. PATENT DOCUMENTS

| 789,948 | 5/1905 | Williams | 138/139 X |
|---|---|---|---|
| 3,794,081 | 2/1974 | Fiser et al. | |
| 4,212,328 | 7/1980 | Yamamoto | 138/138 |
| 4,259,922 | 4/1981 | Kramer | 138/138 |

FOREIGN PATENT DOCUMENTS

| 434829 | 9/1971 | Australia. |
|---|---|---|
| 882707 | 4/1980 | Belgium. |
| 2169478 | 9/1973 | France. |
| 1573189 | 8/1980 | United Kingdom. |

Primary Examiner—Jeffrey V. Nase
Attorney, Agent, or Firm—Schwartz, Jeffery, Schwaab, Mack, Blumenthal & Evans

[57] ABSTRACT

A flexible tube for conveying a mixture of a liquid or solid material containing objects with sharp points, edges or similar projections, the internal wall part of said tube consisting of an elastic material, especially rubber, in which a wearproof material is present in the shape of rod-shaped elements which are provided essentially parallel and at a distance form one another in said internal wall part in such a way that they extend themselves between the inner and the outer surface of said internal wall part, the shortest distance between the most closely spaced wall parts of said elements being at least equal to the greatest dimension (D) of the rod-shaped elements as seen in the radial direction of said elements.

9 Claims, 4 Drawing Figures

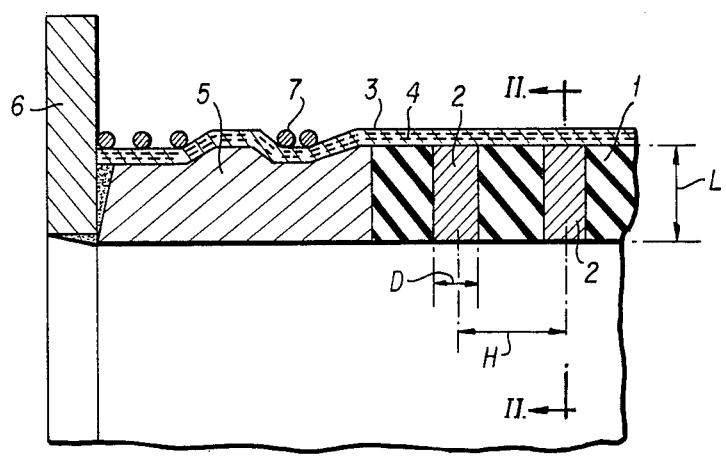
FIG. 1
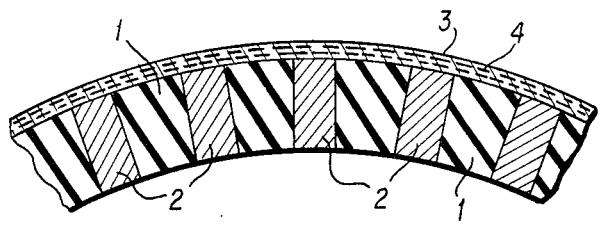
FIG. 2
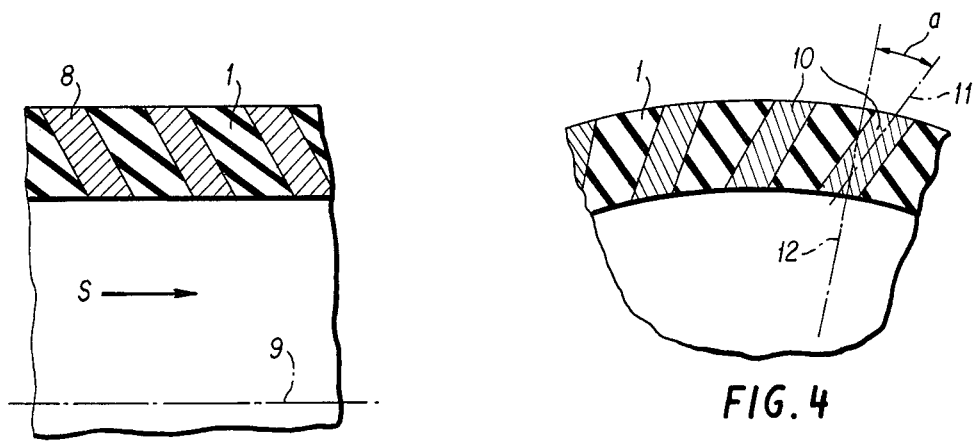
FIG. 3
FIG. 4

FLEXIBLE TUBE FOR CONVEYING A MIXTURE OF A LIQUID AND A SOLID MATERIAL

BACKGROUND OF THE INVENTION

The invention relates to a flexible tube for conveying a mixture of a liquid and a solid material containing objects with sharp points, edges or similar projections, the internal wall part of said tube consisting of an elastic material, especially rubber, in which a wearproof material is included.

Such a tube is known from British Patent Specification No. 1.576.996 (Vredestein). In this case the wearproof material consists of frusto-conical parts, which enclose one another to an important extent, so that there is always a layer of rubber between two parts.

Such a tube, which can have a wall thickness of some dozens of millimeters, can be bent to a limited extent only. High stresses occur in the rubber during bending and that is why in general such a tube is used only for almost static applications, e.g. the mutual connection of tube sections, which together can only constitute a limited angle.

When e.g. material sucked up by a dredger must be conveyed ashore over a considerable distance, such as e.g. some hundreds of meters, use is made of metallic tubes which, in view of the necessary flexibility, are coupled to one another by means of flexible tube sections, so that the pipeline may follow the swell and the movements of the dredger. Wind, current, swell and the like can exert important forces on the pipeline. To avoid rupture of the line it is therefore desirable, that the flexible tube can frequently bend over a considerable angle and, if necessary, collapse, which, however, is not the case with the above-described tube.

Also when, according to French Patent Specification No. 2.367.240, use is made of a wearproof material embedded in the rubber in the shape of rings with a round or flat section, provided in radial planes of the tube, such a tube will not be sufficiently flexible to allow the collapsing of the tube. Nor will this be the case when, also according to said French Patent Specification, a spiral of wearproof material is provided in the tube wall, as during the collapsing the spiral will be deformed to such an extent, that it will not regain its original shape.

SUMMARY OF THE INVENTION

It is the purpose of the present invention to overcome these drawbacks by providing a flexible tube, which is characterized in that the wearproof material is present in the shape of rod-shaped elements, which are provided essentially parallel and at a distance from one another in the internal wall part of elastic material of the tube, in such a way that they extend themselves between the inner and the outer surfaces of this wall part and in such a way that the shortest distance between the most closely spaced wall parts of the elements is at least equal to the greatest dimension of the rod-shaped elements as seen in the radial direction of said elements.

Thus it is obtained that the elastic material of the inner wall of the tube between the rod-shaped elements is continuous in both the longitudinal and circumferential directions, so that the tube will have to an important extent the same flexibility as a normal tube consisting entirely of elastic material.

The rod-shaped elements will be provided preferably in such a way, that the centre lines thereof lie in planes passing through the centre line of the tube. Such a position of the rod-shaped elements contributes to the fact that these elements cause no rotation of the flow in the tube.

According to a further preferable embodiment of the invention, the centre lines of the rod-shaped elements can be provided in the radial direction with respect to the centre line of the tube.

This has the advantage that the flow of the medium through the tube does not have to have a certain direction, as the rod-shaped elements are perpendicular to the flow direction. When the latter is not the case, the flow direction, as seen in an axial plane passing through the centre line of an element, will extend from the place where the lateral surface of the element constitutes an obtuse angle with the head surface towards the place where the opposite lateral surface constitutes a sharp angle with the head surface of the element. With an opposite flow direction the solid material parts would hit the sharp angles of the rod-shaped elements, thus causing a greater wear thereof.

When the centre lines of the rod-shaped elements are provided in radial direction, the flow direction through the tubes does not have to be paid attention to when the flexible tubes are used, which of course offers major advantages when the tubes are used for the above-described purpose, namely for establishing a pipeline with a length of some hundreds of meters.

According to a preferable embodiment of the invention, the rod-shaped elements will have a round cross-section, as with such a cross-section the optimal adhesion between the rod-shaped elements and the elastic material can be obtained.

As with the tube described in the above-mentioned British Patent Specification, the tube according to the present invention will be enveloped by a jacket of rubber or an elastic synthetic material, in which one or more inlays are provided for absorbing the loads exerted on the tube.

The ends of the tube may also be provided in a known way with a flange with a metallic coupling part.

With respect to the application of elements consisting of wearproof material in an elastic material such as rubber, reference can be made to Australian Patent Specification No. 434.829.

This Patent Specification, however, relates to a lining for chutes and the like to convey or carry abrasive materials, square or rectangular elements being embedded in rubber in such a way that they are having mechanical shock resistance to assure against cracking of the ceramic due to impact.

The elements therefore are "closely spaced", so that the wear-resistance is substantially equal to that which can be accomplished with a one hundred percent ceramic surface.

It is obvious that such a lining material is not suitable to be used as a flexible tube, because of the small possibility of deformation as a result of the fact that the elements are "closely spaced".

BRIEF DESCRIPTION OF THE DRAWINGS

The invention will now be explained with reference to an example of an embodiment shown in the drawing, in which:

FIG. 1 partially shows a longitudinal section of a preferred embodiment of a tube according to the present invention, provided with an end flange;

FIG. 2 shows a cross section along the line II—II of FIG. 1 over a part of the tube;

FIG. 3 shows a longitudinal section over a part of a tube, in which the rod-shaped elements admittedly lie in planes passing through the centre line of the tube, but have a position which deviates from the radial direction, and FIG. 4 shows a cross section over a part of a tube, in which the rod-shaped elements constitute an angle with the corresponding radial line.

DETAILED DESCRIPTION OF THE PREFERRED EMBODIMENTS

The tube shown in FIGS. 1 and 2 consists essentially of an elastic material, such as e.g. rubber 1, in which the rod-shaped elements 2 of wearproof material are provided.

The rubber tube 1 is enveloped by a jacket 3, in which the inlays 4 are provided.

At the end of the tube the collar 5 is provided, which is connected with the flange 6. The tubular jacket 3, together with the inlays 4 therein, passes over the collar 5 and the end of the jacket 3 is firmly connected with the collar 5 by means of steel wire which is wound helically around it.

The thickness D of the rod-shaped elements 2 will be approximately half the length L thereof, whereas the distance H between the centre lines of two successive elements 2 will approximately equal the length L of an element. When elements with a round cross section are used, the thickness D corresponds of course with the diameter of the element, whereas when elements with a square cross section are used, the value of D corresponds with the length of the sides of the square.

The cross section of the rod-shaped elements may have many other shapes but round or square, such as rectangular, hexagonal, etc., whereas, seen in the longitudinal direction of the rod-shaped elements, the surface of the cross section may e.g. increase, seen from the centre line of the tube. With a tube of a relatively small diameter it can then be obtained that, seen over the thickness of the tube wall, the ratio between the surface of elastic material and the wearproof material remains constant, even when a part of the rubber and of the rod-shaped elements has worn off.

FIG. 3 shows the possibility that the rod-shaped elements 8 are lying in a plane passing through the centre line 9 of the tube, but form an angle with a plane which is perpendicular to the centre line 9. FIG. 3 shows the then necessary flow direction S.

FIG. 4 shows the possibility that the rod-shaped elements 10 are lying in a plane which is perpendicular to the centre line of the tube, the elements 10, however, being oriented in such a way, that the centre line 11 thereof forms an angle a with the corresponding radial line 12.

Of course, a combination of the positions of FIGS. 3 and 4 is also possible.

The rod-shaped elements 2, 8 and 10 are made in particular of wearproof steel, which can be obtained in many different alloys at relatively low costs. It is also possible, however, to make the rod-shaped elements of other wearproof materials, such as e.g. cast iron, tungsten carbide, ceramic materials and the like.

With an embodiment of the tube according to the invention, round elements are used with a diameter of 25 mm and a length of 60 mm, which are spaced at centre to centre distances of 60 mm.

It will be obvious that only a few possible embodiments of the invention have been shown and that many modifications are possible without leaving the scope of the invention.

I claim:

1. Flexible tube for conveying a mixture of a liquid and solid material containing objects with sharp points, edges or similar projections, the internal wall part of said tube comprising an elastic material, especially rubber, in which a wearproof material is included, wherein the wearproof material is present in the shape of rod-shaped elements, which are provided essentially parallel and at a distance from one another in the internal wall part of elastic material of the tube, in such a way that they extend themselves between the inner and outer surface of this part and in such a way that the distance between any two of said elements is at least as great as the width of any one of said elements, wherein the inner wall part and the rod-shaped elements define a smooth, continuous interior surface.

2. Tube according to claim 1, wherein the centre lines of the rod-shaped elements lie in planes passing through the centre line of the tube.

3. Tube according to claim 2, wherein the centre-lines of the rod-shaped elements are provided in the radial direction with respect to the centre line of the tube.

4. Tube according to claim 1, wherein the rod-shaped elements have a round cross section.

5. Tube according to claim 4, wherein the diameter of the rod-shaped elements amounts to about half the length thereof.

6. Tube according to claim 4, wherein the distance between the centre lines of two adjacent elements is about equal to twice the diameter of the elements.

7. Tube according to claim 1 wherein said rod-shaped elements have free inner ends in contact with said elastic material.

8. Tube according to claim 1 wherein said rod-shaped elements lie in planes containing the center line of the tube but form an acute angle with a plane which is perpendicular to the center line.

9. Tube according to claim 1 wherein said rod-shaped elements lie in a plane which is perpendicular to the center line of said tube but form an acute angle with a radius of said tube.

* * * * *